Oct. 15, 1957     R. E. JOHNSON     2,809,874
SAFETY LATCHES
Filed May 11, 1953     2 Sheets-Sheet 1
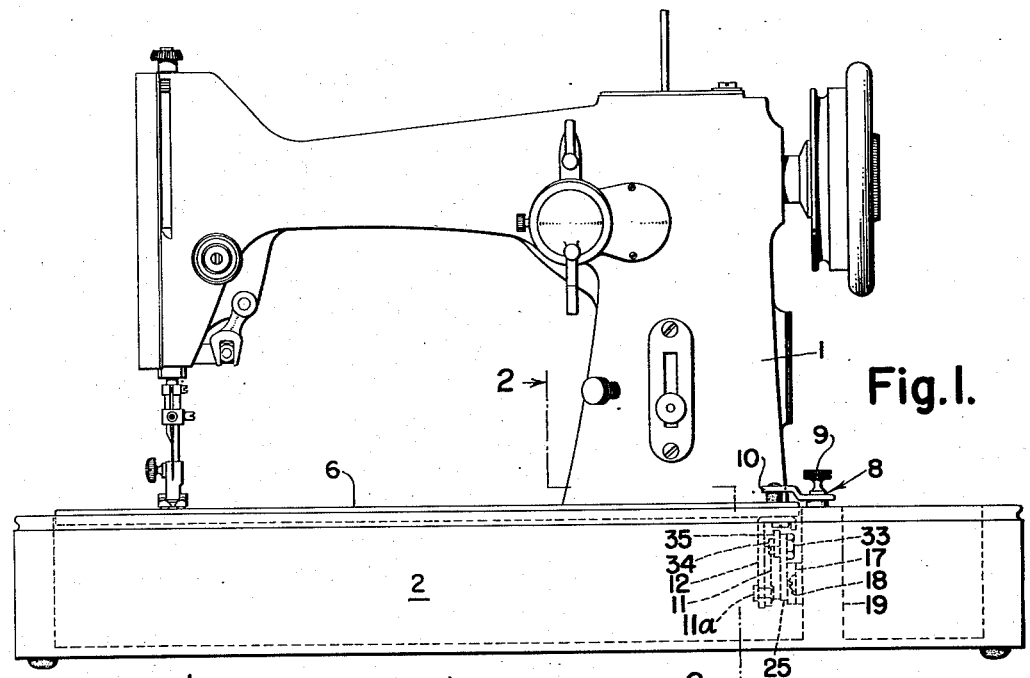
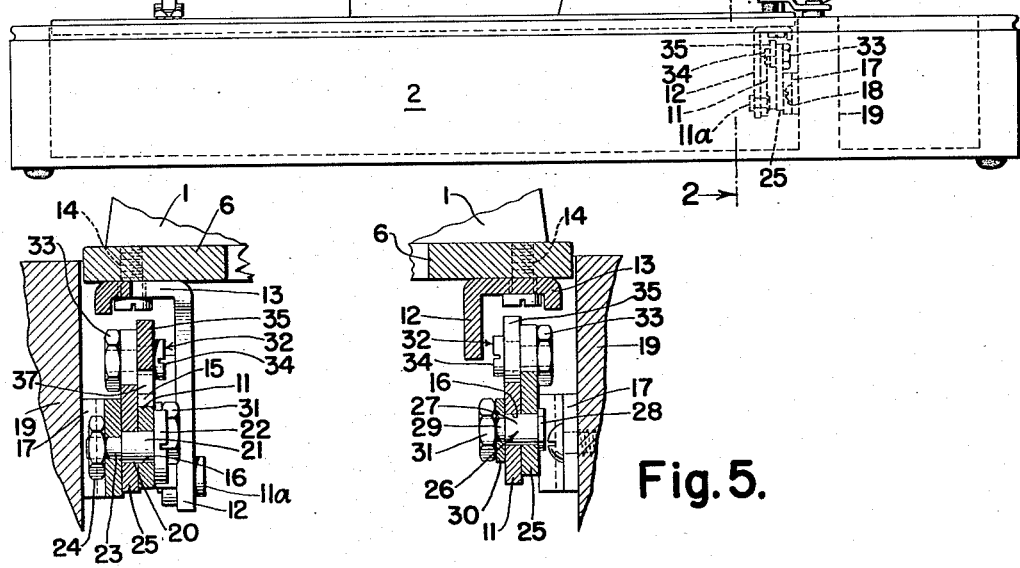
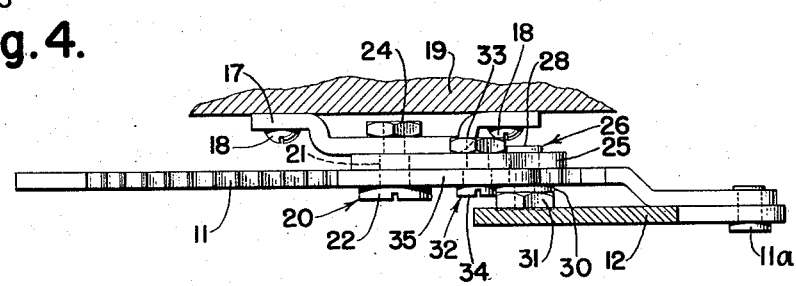
INVENTOR.
Ralph E. Johnson
BY
ATTORNEY
WITNESS:

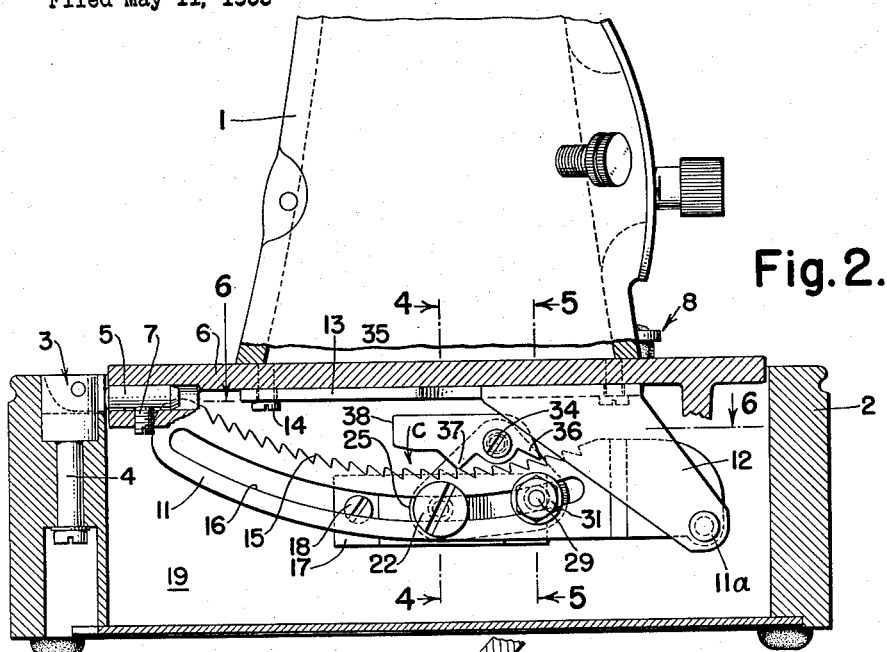
Fig. 2.
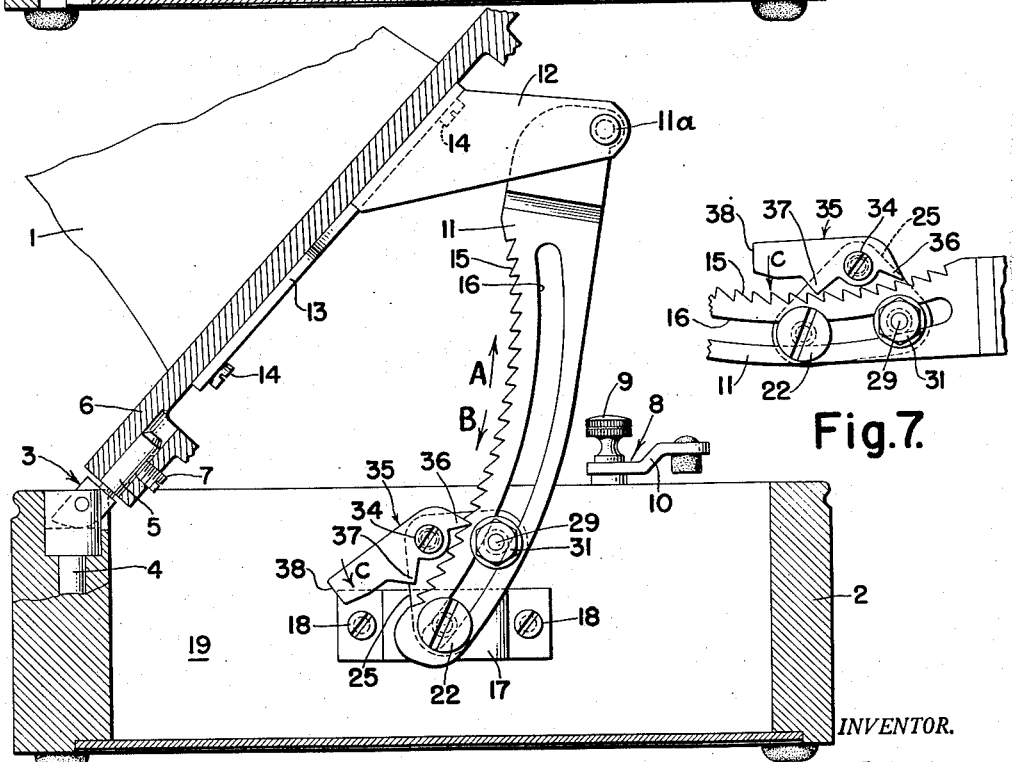
Fig. 7.
Fig. 3.

United States Patent Office 2,809,874
Patented Oct. 15, 1957

2,809,874

SAFETY LATCHES

Ralph E. Johnson, Mountainside, N. J., assignor to The Singer Manufacturing Company, Elizabeth, N. J., a corporation of New Jersey Application May 11, 1953, Serial No. 354,175

10 Claims. (Cl. 311—12)

The present invention relates to a safety latch and has for a primary object to provide a latch mechanism for use between two relatively movable members, which latch will permit only regulated or controlled motion of the members, and which will be thoroughly dependable in operation.

In particular, it is an object of the present invention to provide a safety latch that will permit two relatively movable members to move freely in one direction if desired, but will control the motion in the opposite direction in such a manner that it will automatically and safely lock the two members against further motion if that motion becomes uncontrolled, or exceeds a predetermined maximum.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

Fig. 1 is a front elevation view of a portable type sewing machine in which a safety latch constructed in accordance with the present invention has been installed to control the relative motion between the machine head and the base to which it is pivoted.

Fig. 2 is a fragmentary vertical section view taken substantially on the line 2—2 of Fig. 1.

Fig. 3 is a view similar to Fig. 2 but with the elements arranged in a different position, i. e., with the machine head tilted back with respect to the base.

Fig. 4 is a fragmentary vertical section view taken substantially on the line 4—4 of Fig. 2.

Fig. 5 is a fragmentary vertical section view taken substantially on the line 5—5 of Fig. 2.

Fig. 6 is a fragmentary horizontal section view taken substantially on the line 6—6 of Fig. 2.

Fig. 7 is an exaggerated detail view similar to Fig. 2 illustrating in side elevation a fragmentary portion of the latch mechanism per se with the detent or pawl arranged in a different position from that of Fig. 2.

The present invention is hereinafter described as embodied in a portable type sewing machine having a head 1 that is pivoted to a base 2 in the usual manner, i. e., by a pair of identical hinges such as the one illustrated at 3, which hinge 3 is pivoted to the base 2 by a pivot-element 4 and includes a stud 5 removably secured in a bore provided in a lug in the bed portion 6 of the head 1 by a set screw 7. A latch 8 is pivoted to the base 2 by a stud 9 and includes a finger 10 that is adapted to overlie the bed 6 of the machine head and thus hold the same to the base against any movement relative thereto.

It will, of course, be understood that it is often necessary to gain access to the mechanism of the sewing machine carried by the bed 6 and enclosed by the base 2, particularly to replenish the supply of bobbin-thread.

In the present machine this can be readily accomplished by releasing the latch 8 and tilting the machine back on the hinges 3 as illustrated in Fig. 3. In view of the fact that the machine head 1 is quite heavy, it is desirable to provide a latch to hold the same in the position illustrated in Fig. 3 which would relieve the operator of this fatiguing task and which would give the operator the free use of both hands to replace the exhausted bobbin, or to tend to other adjustment or repair. The latch should also be conveniently automatic and must be very reliable to prevent any accidental release of the same that would permit the machine head 1 to fall while the operator's hands were still in a position to be caught between the machine head 1 and base 2.

In accordance with the present invention, there is provided a novel latch comprising an arcuate rack 11 pivoted at one end by the pivot 11a to an arm 12 depending from a plate 13 that is fixed to the under side of the machine bed 6 by screws 14. The rack 11 is provided with notches in the form of teeth 15 arranged along that edge internally of the arc and with an arcuate slot 16 arranged substantially parallel to the edge having the teeth 15. A bracket 17 is secured by screws 18 to an intermediate transverse wall 19 of the base 2. The bracket 17 carries a pivot screw 20 that includes a shank portion 21 having at one end a head 22 and at the other end a threaded, reduced end-portion 23. The reduced end-portion 23 extends through the bracket 17 and receives a nut 24 threaded upon the end thereof to clamp the bracket between the nut and the shoulder between the shank 21 and the reduced end-portion to secure the screw 20 to the bracket. The shank 21 extends loosely through the slot 16 in the rack 11 and through a pawl-supporting member 25, both the rack 11 and the support 25 being held on the shank 20 by the head 22. Thus, the rack 11 is mounted upon the fixed screw 20 for pivotal and sliding movement relative thereto, and the support 25 is supported upon the same for pivotal movements.

At a point spaced from the screw 20, the support 25 loosely carries a lateral projection in the form of a second pivot screw 26, the shank 27 of which screw also loosely extends through the slot 16 in the rack 11. One end of the shank 27 carries a head 28 and the opposite end 29 is reduced to receive a washer 30 that is clamped against the shoulder between the shank 27 and the reduced end 29 by a nut 31. The support 25 and the rack 11 are confined between the head 28 and the washer 30. The pawl-supporting member 25 carries a further pivot screw 32 located on that side of the rack 11 carrying the teeth 15 and secured thereto by a nut 33 that clamps the support member 25 between the same and a shoulder between the shank of the screw 32 and a reduced end thereof. The screw 32 has a head 34 that holds a pawl 35 loosely upon the shank thereof for free pivotal movement thereon. From the above it will be seen that the support member 25 is pivotally mounted upon the fixed pivot screw 20 and by virtue of the facts that the screw 20 is received within the slot 16 and guides the rack 11, and that the pivot screw 26 carried by the support member 25 also rides in the slot 16, the pivot screw 32 carried by the support member 25 will always be maintained at a fixed distance from the arcuately arranged teeth 15 of the rack and thus the pawl 35 carried thereby will always be in position to engage with any one of the teeth 15 of the rack 11.

The pawl comprises a counterweight portion 38 and a pair of detents 36 and 37 which are adapted alternately to engage with the teeth 15, and which are arranged upon opposite sides of the pivot of the pawl 35 thus alternately to pivot the same. It will be noted that the teeth 15 of the rack 11 are raked and that the detents 36 and 37 of the pawl 35 are so formed that the detent 36 will freely ride over the teeth 15 when the rack is moved relative thereto in the direction of the arrow A, Fig. 3, but will tend to latch with the teeth 15 when the rack is moved in the opposite direction, arrow B, and that the detent 37 will ride freely over the teeth 15 in either direction.

The counterweight portion 38 of the pawl 35 acts to pivot the latter in the direction of the arrow C, Figs. 2, 3 and 7, and thus tends to raise the detent 36 from engagement with the teeth 15, and to bring the detent 37 into engagement with the same, as illustrated in Fig. 2. The parts are so dimensioned and arranged that both of the detents 36 and 37 could not clear or pass over the teeth 15 at the same time, as illustrated in Fig. 7, in which view the detents 36 and 37 are exaggerated to emphasize this point. Also, the detents 36 and 37 are spaced apart a distance substantially equal to the span of four and one-half teeth on the rack 11. This dimension is not critical but it should be equal to a distance that includes a fraction of the pitch of the teeth 15, for example, as illustrated, four and one-half times the pitch of the teeth 15, so that the detents 36 and 37 will tend to engage alternately the teeth 15.

In operation of the device illustrated, the head 1 may be freely swung upwardly in the direction of the arrow A from the position illustrated in Fig. 2 to that illustrated in Fig. 3, with the detents 36 and 37 riding freely over the raked teeth 15 of the rack 11. When the head 1 is lowered in the direction of the arrow B, the detent 36 will tend to latch against the teeth 15, while the detent 37, riding freely over the teeth 15 will tend to throw the detent 36 into operative or latching engagement with the same and the counterweight 38 will tend to withdraw the detent 36 from a position in which it could contact the teeth 15. Thus, if the head 1 is lowered sufficiently slow, the action of the counterweight 38 will overcome the effect of the detent 37 in oscillating the pawl 35 in that direction in which the detent 36 is moved toward operative engagement with the teeth 15, i. e., overcome the inertia imparted to the pawl 35, before the detent 36 contacts one of the teeth 15. However, when the head 1 is lowered rapidly, the pawl 35 will be unable to recover under the action of the counterweight 38 to withdraw the detent 36 away from operating relation with the teeth 15. Thus, the detent 36 will contact one of the teeth and lock or latch the rack 11 against further movement relative thereto. Once latched, the pawl 35 will be held against oscillation by the pressure and frictional forces between the detent 36 and the engaged tooth, and will remain latched until released. It should also be noted that, in addition to that fact that the recovery time of the pawl 35 is greater when the rack 11 is moving faster, because of the greater inertia imparted thereto, the mere fact that the rack itself is moving faster will also tend to latch the mechanism because the teeth are moving more rapidly toward the depressed detent 36 and will contact it sooner.

From the above, it will be seen that, in the disclosed embodiment of the invention, the head 1 may be freely tilted upwardly and backwardly about its pivots, from the position illustrated in Fig. 2 to that illustrated in Fig. 3. To latch the same in the raised position, it is necessary only to release the same and permit it to fall freely towards its closed position, which motion immediately throws the detent 36 into latching engagement with the teeth 15 and causes it to lock against one of them as illustrated in Fig. 3. If the latch is thereafter accidentally released and the head 1 tends to fall freely toward its closed position, the detent 36 will again be thrown immediately into latching engagement with the teeth 15. To lower the head 1, it is tilted back slightly to permit the counterweight 38 to oscillate the pawl 35 to remove the detent 36 from engagement with the teeth 15, and thereafter freely lower it slowly to its closed position.

It will, of course, be obvious to those skilled in the art that a safety latch constructed in accordance with the present invention would also be useful with a linear rack or with two members arranged for relative movement in a single plane. Also, it will be evident that the counterweight 38 serves to bias the pawl 35 in the direction of the arrow C and, although this is the preferred construction, other suitable means, such as a light spring, could be used.

Numerous alterations of the structure herein disclosed will suggest themselves to those skilled in the art. However, it is to be understood that the present disclosure relates to a preferred embodiment of my invention which is for purposes of illustration only and not to be construed as a limitation of the invention. All such modifications which do not depart from the spirit of the invention are intended to be included within the scope of the appended claims.

Having thus set forth the nature of the invention, what I claim herein is:

1. A latch mechanism comprising a pair of relatively movable elements, said elements comprising a member having a series of notches and a pivoted pawl having a first detent carried by said pawl to one side of the pivot thereof and in position to contact said notches during relative motion of said elements, said first detent and said notches being formed so that said detent will latch against said notches in one direction of motion between said elements, a second detent carried by said pawl on the opposite side of the pivot thereof from said first detent and in position to contact said notches, said second detent being formed to ride freely over said notches in both directions of motion between said elements, and yielding means exerting a substantially constant force for urging said pawl in that direction in which said first detent is withdrawn from contact with said notches.

2. A latch mechanism comprising a pair of relatively movable elements, said elements comprising a rack having a series of teeth and a pivoted pawl having a first detent in position to contact said teeth during relative movement of said elements, said detent and said teeth being formed so that said detent will latch against said teeth in one direction of motion between said elements, a second detent arranged upon said pawl on the opposite side of the pivot thereof from said first detent and in position to engage said teeth, said second detent being formed to ride freely over said teeth in both directions of relative motion between said elements for pivoting said pawl to extend said first detent into the space between adjacent ones of said teeth, and yielding means exerting a substantially constant force for biasing said pawl in the opposite direction for withdrawing said detent from the space between said teeth, whereby, upon relative motion between said elements at a speed below a predetermined maximum, said means will be able to effect recovery of said pawl in time to withdraw said first detent from contacting and locking with said teeth.

3. A latch mechanism comprising a pair of relatively movable elements, said elements comprising a member having a series of teeth and a pivoted pawl having a first detent carried by said pawl in position to contact said teeth during relative motion of said elements, said first detent and said teeth being formed so that said detent will latch against said teeth in one direction of motion between said elements, a second detent carried by said pawl on the opposite side of the pivot thereof from said first detent and in position to contact said teeth, said second detent being formed to ride freely over said teeth in both directions of motion between said elements, the extremities of said detents being spaced apart a distance equal to a predetermined number of teeth plus substantially one-half of the pitch of said teeth, and means exerting a substantially constant force for urging said pawl in that direction in which said first detent is withdrawn from contact with said teeth.

4. A latch mechanism including a pair of relatively movable elements comprising a pawl and a rack, said rack being provided with a series of notches and a slot arranged substantially parallel to said series of notches, a stationary pivot element extending through said slot, a pawl-supporting member freely pivoted on said pivot element and having a lateral projection spaced from said pivot element and extending into said slot, said pawl being freely pivoted to said pawl supporting member adjacent the series of notches on said rack and in position to engage the same.

5. A latch mechanism for use between a pair of pivotally interconnected elements comprising a rack pivoted to one of said elements, said rack having a series of teeth and a slot arranged substantially parallel to said series of teeth, a pivot stud fixed to the other of said elements and extending loosely through said slot, a pawl-supporting member loosely pivoted on said pivot-stud and having a lateral projection spaced from said pivot element and extending into said slot, a pawl pivotally carried by said member, a first and a second detent carried by said pawl upon the opposite sides of the pivot thereof and in position to contact said teeth, said first detent and said teeth being formed so that said first detent will lock against said teeth when said rack is moved relative thereto in one direction and to ride freely thereover when said rack is moved in the opposite direction, said second detent being formed to ride freely over said teeth upon movement of said rack in both directions relative thereto, and means exerting a substantially constant force for biasing said pawl about its pivot in that direction in which said first detent is withdrawn from contact with said teeth.

6. In a sewing machine having a base, a head pivoted thereto, and a latch mechanism interposed between said base and said head, said latch mechanism comprising a rack pivoted to said head and provided with teeth along one edge thereof and a slot arranged substantially parallel to said teeth, a pivot element carried by said base and extending through said slot, a pawl-supporting member pivotally mounted on said pivot element and including a lateral projection extending into said slot at a point spaced from said pivot element, a pawl pivoted to said member and including a first and a second detent arranged on opposite sides of the pivot thereof in position to engage said teeth, said first detent and said teeth being formed so that said detent will latch with said teeth when said rack is moved in one direction relative thereto and to ride freely over said teeth when said rack is moved in the opposite direction, said second detent on said pawl being formed to ride freely thereover in both directions of motion of said rack, and means exerting a substantially constant force for biasing said pawl about its pivot in that direction in which said first detent is urged away from said teeth.

7. The combination in accordance with claim 6 in which said last mentioned means comprises a counterweight carried by said pawl.

8. In a sewing machine having a base, a head pivoted thereto, an arm extending from said head toward said base, a rack pivoted to said arm and provided with a series of teeth along one edge thereof and a slot arranged substantially parallel to said teeth, a pivot element carried by said base and extending through said slot to control the motion of said rack, whereby said rack will be positioned substantially parallel to said base when in the one position and substantially normal thereto when in the other position, a pawl-supporting member pivotally mounted on said pivot element and including a lateral projection extending into said slot at a point spaced from said pivot element, a pawl pivoted to said member and including a first and a second detent arranged on opposite sides of the pivot thereof in position to engage said teeth, said first detent and said teeth being formed so that said detent will latch with said teeth when said rack is moved in one direction relative thereto and to ride freely over said teeth when said rack is moved in the opposite direction, said second detent on said pawl being formed to ride freely thereover in both directions of motion of said rack, and means exerting a substantially constant force for biasing said pawl about its pivot in that direction in which said first detent is urged away from said teeth.

9. A latch mechanism comprising a pair of relatively movable elements, said elements comprising a member having a series of notches and a pivoted pawl having a detent normally in position to contact said notches during relative motion of said elements, said detent and notches being formed so that said detent will latch against said notches in one direction of motion between said elements, positive means actuated by said member upon relative motion between said elements for pivoting said pawl in that direction in which said detent is moved toward contacting relation with said notches, said positive means having an effective action that is variable in direct proportion to the speed of relative motion between said elements, and means exerting a substantially constant force for biasing said pawl in the opposite direction, said last-mentioned means and said positive means being so proportioned that at speeds of relative motion between said elements below a predetermined minimum said last mentioned means will keep said detent out of locking engagement with said notches and at speeds above said predetermined minimum said positive means will move said detent into locking engagement with said notches.

10. A latch mechanism including a pair of relatively movable elements comprising a pawl and a rack, said rack being provided with a series of notches and a slot arranged substantially parallel to said series of notches, a stationary pivot element extending through said slot, a pawl-supporting member freely pivoted on said pivot element and having a lateral projection spaced from said pivot element and extending into said slot, said pawl being freely pivoted to said supporting member, a detent carried by said pawl in position to contact said notches and said detent and notches being formed so that said detent will latch against said notches in one direction of motion between said elements, positive means actuated by said rack upon relative motion between said elements for pivoting said pawl in the direction in which said detent is moved toward contacting relation with said notches, said positive means having an effective action that is variable in direct proportion to the speed of relative motion between said elements, and means exerting a substantially constant force for biasing said pawl in the opposite direction, said last-mentioned means and said positive means being so proportioned that at speeds of relative motion between said elements below a predetermined minimum, said last mentioned means will keep said detent out of locking engagement with said notches and at speeds above said predetermined minimum said positive means will move said detent into locking engagement with said notches.

References Cited in the file of this patent

UNITED STATES PATENTS

| Number | Name | Date |
|---|---|---|
| 70,597 | Mora | Nov. 5, 1867 |
| 103,472 | Kerigan | May 24, 1870 |
| 140,929 | Loth | July 15, 1873 |
| 683,499 | Richard | Oct. 1, 1901 |
| 1,121,713 | Cogger | Dec. 22, 1914 |
| 2,001,507 | Stribling | May 14, 1935 |
| 2,409,758 | Hohmann et al. | Oct. 22, 1946 |
| 2,477,433 | Webb | July 26, 1949 |
| 2,631,074 | Stump | Mar. 10, 1953 |

FOREIGN PATENTS

| Number | Country | Date |
|---|---|---|
| 252,119 | Switzerland | Oct. 1, 1948 |
| 502,164 | Great Britain | June 9, 1937 |